US009313455B1

(12) United States Patent
Moeeni et al.

(10) Patent No.: US 9,313,455 B1
(45) Date of Patent: Apr. 12, 2016

(54) AUTOMATED AUDIO/VIDEO DISTRIBUTION SYSTEM

(71) Applicant: Arkansas State University-Jonesboro, State University, AR (US)

(72) Inventors: Farhad Moeeni, Jonesboro, AR (US); Keane McGough, Cane Ridge, TN (US)

(73) Assignee: Arkansas State University—Jonesboro, State University, AR (US)

( * ) Notice: Subject to any disclaimer, the term of this patent is extended or adjusted under 35 U.S.C. 154(b) by 0 days.

(21) Appl. No.: 14/683,096

(22) Filed: Apr. 9, 2015

Related U.S. Application Data

(63) Continuation-in-part of application No. 61/977,414, filed on Apr. 9, 2014.

(51) Int. Cl.
*H04N 7/15* (2006.01)
*H04N 7/14* (2006.01)
*H04N 7/18* (2006.01)
*G07C 1/24* (2006.01)
*G06K 7/10* (2006.01)

(52) U.S. Cl.
CPC .............. *H04N 7/15* (2013.01); *H04N 7/141* (2013.01); *G06K 7/10425* (2013.01); *G07C 1/24* (2013.01); *H04N 7/188* (2013.01)

(58) Field of Classification Search
CPC ......... G07C 1/24; H04N 7/188; H04N 7/141; G06K 7/10425
USPC ....................................... 348/14.05
See application file for complete search history.

(56) References Cited

U.S. PATENT DOCUMENTS

| | | | |
|---|---|---|---|
| 2004/0201738 A1* | 10/2004 | Moores ............ | H04N 1/00137 348/231.2 |
| 2012/0075475 A1* | 3/2012 | Mariadoss ......... | G08B 13/196 348/159 |
| 2013/0342699 A1* | 12/2013 | Hansen ................. | G07C 1/24 348/157 |

* cited by examiner

*Primary Examiner* — Creighton Smith
(74) *Attorney, Agent, or Firm* — Schrantz Law Firm, PLLC; Stephen D. Schrantz

(57) ABSTRACT

An intelligent sensor assisted system that dynamically adapts to the video streaming needs of a network or sub networks of users in order to facilitate collaboration. This automated audio/video distribution system includes an RFID sensor system that allows the system to intelligently activate the cameras/audio devices located at a zone according to user's needs. The system detects an RFID tag that is associated with a user. The system identifies a group ID of the RFID tag. The system identifies all users in the cyberspace that belong to the group. The system activates the streaming of audio/video to capture the user's activities at the zone. The system then transmits the audio/video feed to remote users in the cyberspace who share the same Group ID.

20 Claims, 11 Drawing Sheets

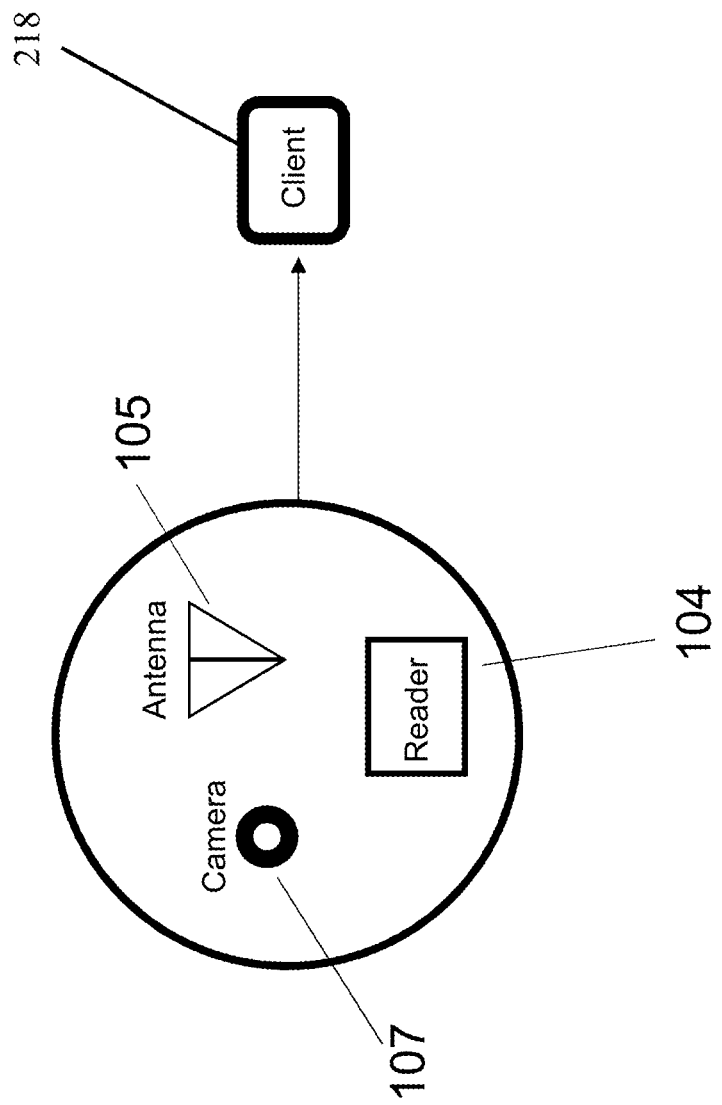

AUTOMATED AUDIO/VIDEO DISTRIBUTION SYSTEM

CROSS-REFERENCE TO RELATED APPLICATIONS

This application claims priority to and is a continuation in part of U.S. Patent Application No. 61/977,414 filed on Apr. 9, 2014 entitled "AUTOMATED AUDIO/VIDEO DISTRIBUTION SYSTEM".

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

The present invention relates generally to a cyber learning, conferencing, meeting system that increases user participation and involvement. In this application, the words teacher, professor, moderator, speaker, trainer, and similar terms are used interchangeably. Also the words student, participant, attendee, trainee, and similar terms are used interchangeably. The word user represents the members of any of the two groups above. It is understood that the description of the present invention is characterized in the context of courses and classes for simplicity without loss of generality of applications to other arrangements and settings.

The present invention transmits audio and video feeds from a location to users across a network. Despite technological advances and widespread use of the Internet for distant education, the on-line courses and the cyber learning/conferencing concept faces the following limitations:

- Online courses/meetings are suitable for conceptual subjects that do not have laboratory elements.
- It is difficult to deliver online courses/conferences if not impossible for subjects with hands-on activities such as technology, engineering or sciences, in which laboratory experimentation is an integral part.
- In dual-mode courses/meetings with hands-on or laboratory components that encompass both on-site and off-site participants, the on-site students and attendees may have the opportunity to interact with the instructor and other on-site attendees on a particular lab experiment. However, the remote or off-site students or participants' opportunity to interact in real-time and in a synchronous manner with the instructor, on-site peers, or other off-site attendees is limited. Therefore, interactive collaboration and group experimentation and activities are impractical for all but the on-site students.

Description of the Known Art

Currently, online learning/conferencing technologies such as Skype, BB Collaborate, etc. are capable of delivery and communication of voice and video. The major thrust of current systems is to facilitate face-to-face dialogue. In other words, these systems are designed to allow people to see each other's faces while conversing.

Such inflexibility causes the current systems to be insufficient for use in a laboratory environment with multiple experimental stations that may need to be used in real-time, in any order or sequence or in parallel. The current systems are neither effective nor efficient when used in laboratory environments, courses with hands-on components, or courses that teachers and participants need to move and when the location of activities is dynamic and changes frequently.

Patents and patent applications disclosing relevant information are disclosed below. These patents and patent applications are hereby expressly incorporated by reference in their entirety.

U.S. Pat. No. 6,791,603 issued to Lazo, et al. on Sep. 14, 2004 ("the '603 patent") teaches a system that tracks and electronically identifies assets from surveillance zone to surveillance zone within a controlled area. The '603 patent teaches that a triggering event, which can be the output of an RFID reader, or other event, initiates video tracking of the asset that is associated with the RFID tag or other trigger. The video surveillance taught by the '603 patent continues from zone to zone, as the image of the asset is handed-off from camera to camera. The image of the asset taught by the '603 patent can be selectively displayed and recorded, along with the identity of the asset. The '603 patent teaches that the system is programmable for use in a plurality of different environments and surveillance zones, using a plurality of different triggering sensors and video cameras.

U.S. Publication No. 20100033575 to Lee, et al. on Feb. 11, 2010 ("the '575 publication") teaches an event surveillance system that includes: a network camera for monitoring real-time video images to perform event tracking on an event occurred therein; and at least one machine-to-machine agent, connected to the network camera and devices in a network, for providing protocols for data communications between the network camera and the devices. If the machine-to-machine agent receives information on the event occurred in the network camera, the machine-to-machine agent taught by the '575 publication requests the devices to provide event information for use in verifying accuracy of the event and verifies the accuracy of the event based on the event information provided by the devices. The network camera taught by the '575 publication monitors in real time the event verified to be accurate.

The known art does not provide the ease of transitioning between audio/video feeds made capable by the present invention. The ease of transmitting different feeds among users enables the present invention to be used in a learning environment in which users travel to different zones. The feeds are then transmitted to users according to the feeds designated for each user.

SUMMARY OF THE INVENTION

The present invention provides new methods for cyber learning and collaboration by applying sensor technologies to overcome the limitations of the known art. The method of the present invention can be applied in a variety of situations where the learning environment is dynamic or hands-on experimentation is required. The present invention allows the automatic control of multiple input sources without human intervention. Video and audio sources of the present invention are activated and deactivated automatically as needed without requiring interference from a teacher or moderator. The present invention allows off-site students to receive video and/or audio signals based upon the location of the teacher, such as the experimental station that the teacher is attending and lecturing or the location of other group members. The present invention also allows the teacher and on-site students to receive audio and video from off-site participants.

The present invention utilizes a camera and microphone installed at a zone, such as a laboratory or work station. The zone could be any setting or location in which an activity of interest that should be broadcast may occur. In one embodiment, one or more stations, such as four stations, are configured with a camera and microphone to broadcast activities and events at each station. In one embodiment, the system broadcasts the activities occurring at the position of the user with the appropriate RFID tag, such as a teacher or group member, to the off-site students or audiences. As the teacher with an RFID tag moves from one station to another, the system stops broadcasting activities at the previous station and begins broadcasting the activities occurring at the position of the teacher with the RFID tag. In another embodiment, the location of a group member with the RFID tag causes the system to transmit the data to fellow group members only.

The changing of the transmission occurs based upon a user's location without requiring user input to activate the transmission. Thus, the present invention transmits information without requiring the user to control the input source in a classroom or laboratory. The present invention also allows off-site students to communicate with the professor or other group members regarding the current experimentation.

It is clear that the manual control of input sources requiring the teacher to activate or deactivate the correct cameras or microphones is confusing, inefficient and impractical. It diverts the attention of the teacher and students from the subject and experimentation to the non-value added activities of controlling cameras and microphones. The use of existing technologies to deliver lab experimentation from a dynamic laboratory environment to remote students proved to be ineffective, inefficient, and confusing such that new technology was needed.

The present invention activates and deactivates input sources as a user moves from one station to another station for discussion or presentation of an experiment. Currently, a major obstacle associated with the online delivery of laboratory courses is that there is no effective mechanism for allowing off-site students to be active participants in laboratory experimentations. Thus, the present invention provides for collaborative cyber teams or other collaborative teams. Such collaborative teams may work together on common projects remotely in a work environment. Cyber teams include, but are not limited to, two types of members, one or more on-site members and one or more off-site members. By integrating cyber teams and sensor technologies, the present invention facilitates the collaboration of multiple, simultaneous intra-teams activities. In other words, the members of a team can perform experiments in one station while other teams are performing experimentations in other stations, simultaneously, without interfering with each other. The off-site members of each team can collaborate with the on-site members of the same team. The pairing of on-site and off-site students as a cyber team allows close collaboration between students. The present invention enables off-site students to collaborate, discuss, suggest ideas to their on-site team members and view the results in real-time.

One embodiment of the present invention enables teams to perform experiments along with remote users. For example, assume there are four experiment stations (1 through 4) and two cyber teams A and B, each having three members (A1, A2, A3 and B1, B2 and B3). Furthermore assume that A1 and B1 are the on-site students and the others (A2, A3, B2, and B3) are off-site students. When A1 attends station 2, a communication network among A1, A2 and A3 is created and team A can perform experiments at station 2. Simultaneously, team B can be performing experiments at Station 4. When these teams complete one set of experiments and move to a different station to perform new experimentations, the communication network of each team is adjusted accordingly. In other words, the right cameras and microphones are activated and deactivated as needed without any inter-team interference.

In another embodiment of the present invention, the professor may attend a station to perform experiments. The audio and video signals associated with the current experiment can be delivered to all participants by the professor. The professor possesses an RFID tag that identifies the professor as a master user. The system automatically broadcasts the activities of the master user at the station which the master user is currently located. As the professor leaves a station to attend a different station for new experimentations, a new communication network is created to deliver the video/audio from the current station to all students. It is also possible that the audio/video feed from the professor is transmitted to a subset of the students. In other words, the audio/video of a particular experiment may be delivered to the subset of students.

The system identifies the users to whom the audio/video feed is to be transmitted. The system provides unique RFID tags that identify each user. The RFID tags identify master users that should broadcast to all remote users, super group users that may broadcast to multiple groups, and group users that broadcast to a single group. A database of the present invention associates each unique RFID tag number with a network formation among all students or subsets of users. Each remote user is associated with at least one RFID tag number such that remote user will receive the audio/video feed of the active zones where at least one of the RFID tag numbers is detected. The system also establishes a priority of the RFID tag numbers to identify which feed should be transmitted to the remote user.

It is an object of the present invention to improve the classroom experience for offsite students or attendees.

It is another object of the present invention to simplify the process of activating the transmission of audio and video devices.

It is another object of the present invention to automatically activate a camera and a microphone.

It is another object of the present invention to provide a hands free activation or deactivation of a camera and microphone streaming.

It is another object of the present invention to transmit video and audio to designated users.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 11 is a schematic view of one component of the present invention.

DETAILED DESCRIPTION

The audio/video distribution system of the present invention may be used in a learning environment, such as a classroom, laboratory, work environment, clinical environment, studio, performing arts center, etc. The audio/video distribution system in one embodiment implements sensors to activate the transmission of the audio/video feed and/or data. The audio/video feed may refer to audio and/or video feed. The present invention may be implemented on at least one computing device, such as a computer, tablet, smart phone, laptop, etc.

Sensors, in general, are devices that can detect changes in the environment or physical properties and/or respond to it or collect data accordingly. The collected data can then be delivered to computers to perform a desired function. Such sensors may include, but are not limited to, a tag detector, biometric scanners, bar code scanners, RFID scanners and many other sensors that collect data.

The sensors of the present invention may automatically and seamlessly control multiple cameras on an as-needed basis. Such capability allows the automatic activation of only those cameras and microphones that cover the current focal points, desired environment, events, laboratory experiments, etc. When a different activity triggers the sensors, the corresponding cameras associated with the sensors automatically activate. No manual command or switching should be necessary for the required transition.

Figure 1:
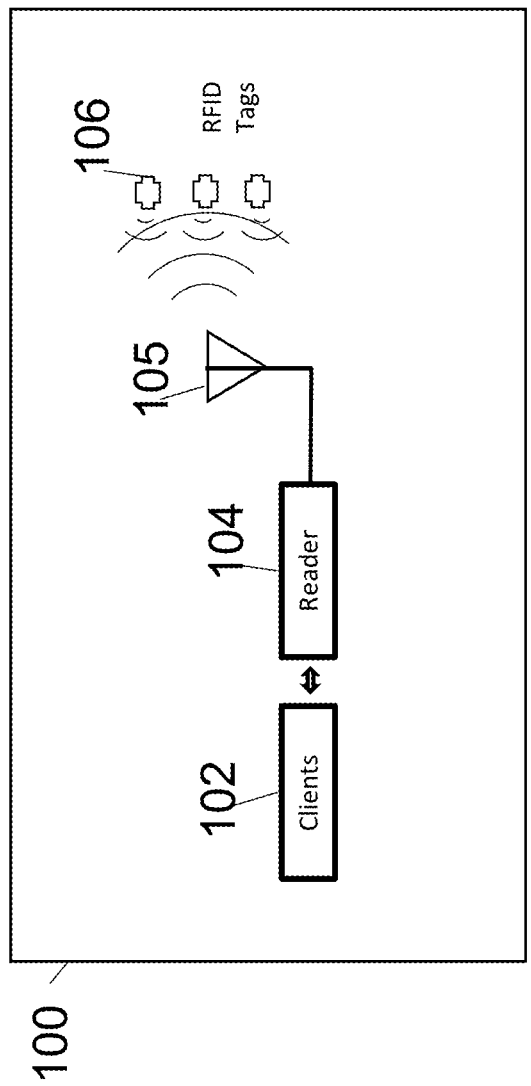
FIG. 1 is a schematic view of one embodiment of the present invention

Referring to FIG. 1, the distribution system includes an identification system, such as an RFID (radio frequency identification) system 100 that allows the system to activate the cameras/audio devices. The RFID system 100 includes sensors, such as tag detectors, and identifier devices, such as identifier tags which include but are not limited to smart phones, NFC devices, digital authentication devices, digital identification devices, RFID tags, etc., that communicate enabling the system to properly identify at least one user currently located at a sensor. The RFID system 100 allows activities to be triggered intelligently based on the information or credentials presented to the sensor. In one embodiment, the RFID system 100 is implemented with wireless communication. The wireless communication may include WIFI, Bluetooth communication, near-field communication (NFC), far-field communication (FFC), backscatter, UHF (860-960 MHz) RFID, which is relatively low-cost, has the highest read range, and offers relatively large selection of possible hardware and software, HF, and/or LF. Other RFID systems, sensors, and tags may be used.

RFID systems 100 include tag detectors, such as readers (interrogators) 104 and identifiers, such as transponders (identifier tags 106). The readers 104, one type of tag detector, have processors, radio transmitters/receivers, and antennas. Identifier tags 106 have a microchip that performs processing and that stores data. The tags 106 also include communication circuitries and antennas. FIG. 1 depicts the operation of an RFID system 100. Clients 102 (various applications and computer programs) instruct readers 104 to sense and identify RFID tags 106 in their read zones in order to perform specific operations such as read or write operations. Following the request, readers 104 communicate with tags 106 by emitting radio signals through antennas 105 in order to request data from the tags 106 or write data to the tags 106. Tags 106 respond to readers' 104 requests by transmitting data stored in the tag's 106 memory or write back data onto the tag's 106 memory.

RFID systems 100 may be distinguished based on at least three criteria: coupling method, frequency, and active or passive operation. While several methods of coupling are possible, the majority of RFID systems in use today either employ inductive coupling for near-field communication (NFC) or backscatter coupling for far-field communication (FFC). For near field communication and inductive coupling, the antennas of both the reader and the tag are formed like coils. The magnetic field generated by the reader induces a current in the coil of the tag. The induced energy activates the electronic circuitries of the tags for transferring data between the tag and the reader. In far-field communication, readers and tags commonly employ dipole antennas. When a tag is exposed to the electromagnetic field of a reader, a tiny amount of electromagnetic energy, absorbed by the tag's antenna energizes the microprocessor and its radio circuitries to transmit the stored data (usually an ID number) to the reader through a process called backscatter coupling.

RFID systems may be designed to operate at any given frequency. The most common frequencies of operation are Low Frequency (LF, 125 KHz and 136 KHz), High Frequency (HF, 13.56 MHz), Ultrahigh Frequency (UHF, 433 MHz and 860-960 MHz), and microwave (2.5 and 5.8 GHz). Most of these frequency bands are unlicensed if the output power complies with regulations. In the United States, these frequencies are referred to as the Industry, Scientific and Medical band (ISM). The LF and HF RFID systems employ inductive coupling, which has very low range. On the other hand, UHF and microwave systems primarily utilize electromagnetic coupling that has much higher range. Characteristics of radio waves change with frequency and impact their suitability for various applications. For example, low frequency RFID perform better than other frequencies in the presence of water. Hence, it is suitable for animal identification. UHF and microwave bands have relatively longer ranges but are more susceptible by the presence of moisture and metal in the use environments.

Active tags (or transponders) have their own power source (battery), create their own radio signals and may be integrated with sensors for logging and transmitting sensor-generated data to readers. The active tags can also initiate communication with readers. Because of these attributes, active tags have long communication ranges and can withstand environmental electromagnetic noise. However, these active tags are also bulky and expensive.

Passive tags, on the other hand, neither have an internal power source nor create their own radio signals. Thus, passive tags have simple designs and are relatively inexpensive. Passive tags only operate if exposed to the electromagnetic field of an interrogator. The passive tags must harvest sufficient energy from the reader through inductive or backscatter coupling.

A third class of tags, referred to as semi-passive tags, is also in use today. These tags supply their own batteries but do not generate their own radio signals. The semi-passive tags operate like passive, backscatter tags. The added battery improves their responsiveness, increases the communication range, and allows them to be integrated with sensors and to log sensor-based data for transmission to readers. It should be pointed out that the current RFID standards designate passive, backscatter UHF tags operating in the 860-960 MHz band for the global supply chain applications. UHF tags have relatively long range (up to 10 meters) and low costs (5-10 cents each) that makes them suitable for supply chain applications. In recent years, UHF tags operating in near-field (NFC) have become commonly available for applications that require a very short read range.

One embodiment of the audio/video distribution system employs a passive UHF (860-960 MHz) system. The passive UHF system has the highest read range, within the ISM band. Passive backscatter tags, on the other hand, offer a very low-cost means of identification. Other embodiments can be modified to work with other RFID frequencies and tag types. The essence of the present invention may be implemented utilizing various RFID systems.

Figure 2:
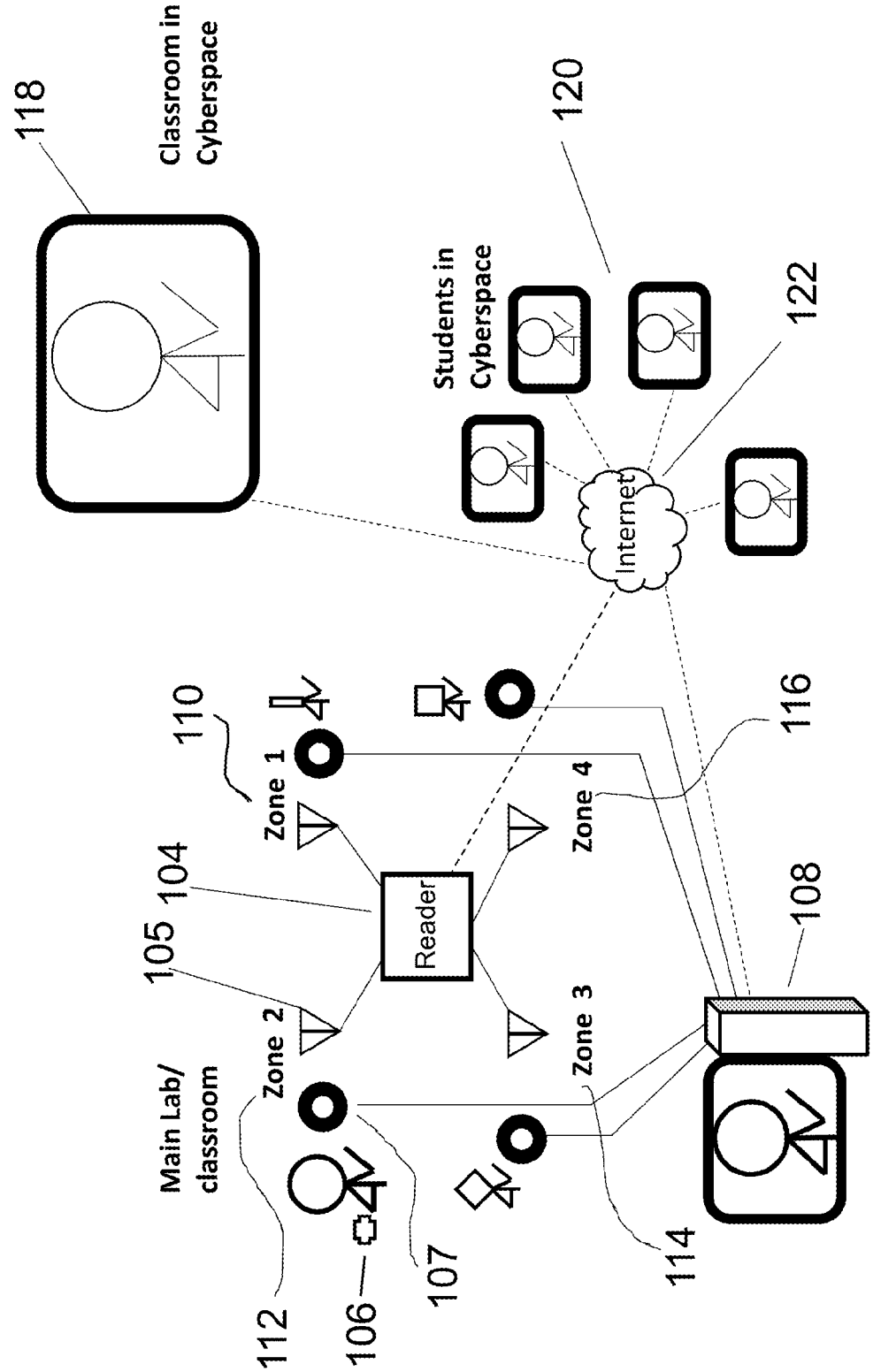
FIG. 2 is an environmental view of one embodiment of the present invention.

Referring to FIG. 2, each point of interest corresponds to a zone 110, 112, 114, 116, work station or location that an activity, such as a learning activity, is happening in real time. To capture the activities occurring at a specified location, a set of one or more cameras envelop each of several points of interest or activities. In one embodiment, at least one camera and/or microphone is associated with each zone to capture audio and/or video of the activities occurring within each zone. Each zone 110, 112, 114, 116 is monitored by one or more sensors, including but not limited to tag detectors, readers, identification device readers, RFID antennas. Antennas 105 are connected to one or more RFID readers 104.

Antennas transmit the ID number of RFID tags 106 that are in the electromagnetic field of the antenna 105 to the readers 104. These tags 106 may be affixed to a name tag, wrist band, pin, badge, etc. that a user, including but not limited to a professor or a student, is wearing. The readers 104 detect the ID of the RFID tag number and activate the cameras and/or microphones in the zone in which the RFID tag is detected, the active zone. The readers 104 process and pass the information to controlling computers that also control the cameras and microphones.

Continuing to refer to FIG. 2, a program running on the computers 108 decides which camera(s) to activate based on the antenna associated with a zone that detects a tag 106. The computers 108 then stream the audio and video captured by the designated camera(s) of the active zone to the users associated with the detected tag.

Figure 8:
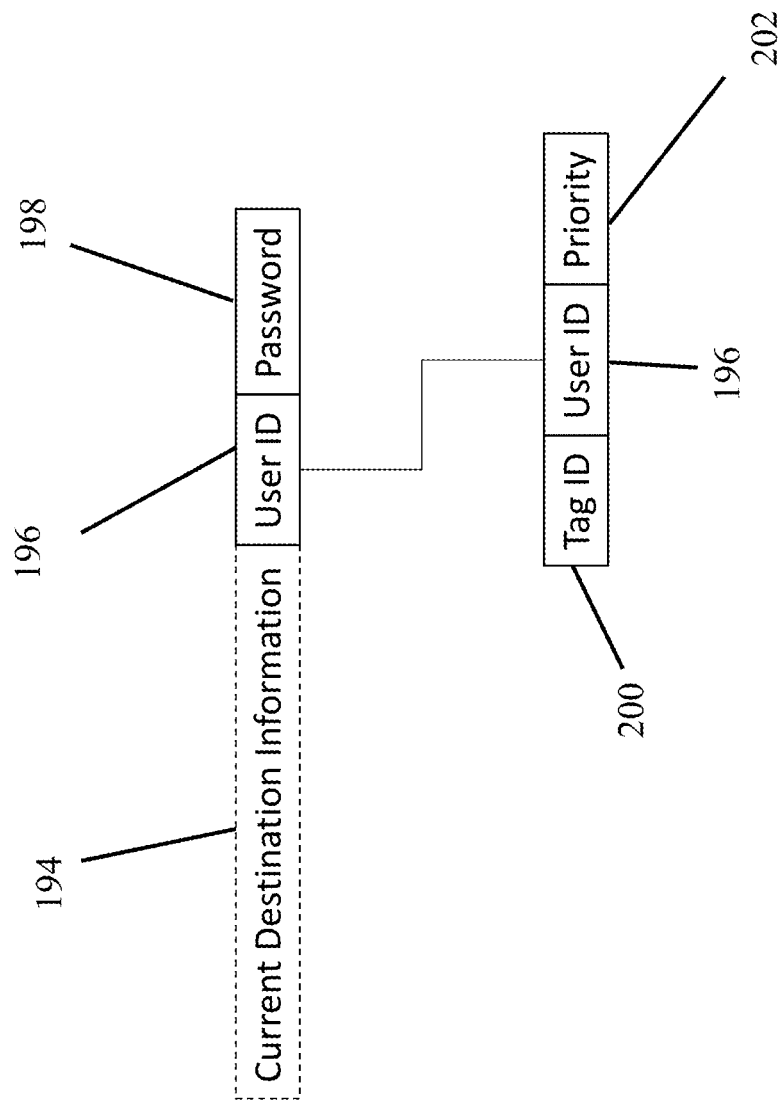
FIG. 8 is a schematic view of one embodiment of the present invention.

In one embodiment as shown in FIG. 8, each user is associated with a unique user identifier 196 that identifies the user and a password 198. Each user may also be associated with a device ID, including but not limited to Tag ID 200 of an identifier tag, an identification code established by identification device, etc. The system can then determine which users to transmit the audio/video data based upon the users who are associated with the Tag ID 196 of the detected identifier tag detected at a particular zone. In such an embodiment, the system detects a Tag ID 200. The system then identifies the user IDs 196 associated with the Tag ID 200. The system then transmits the audio/video data to the users associated with the Tag ID 200. The system transmits the audio/video data to the Current Destination Information 194 of the user ID 196.

Figure 9:
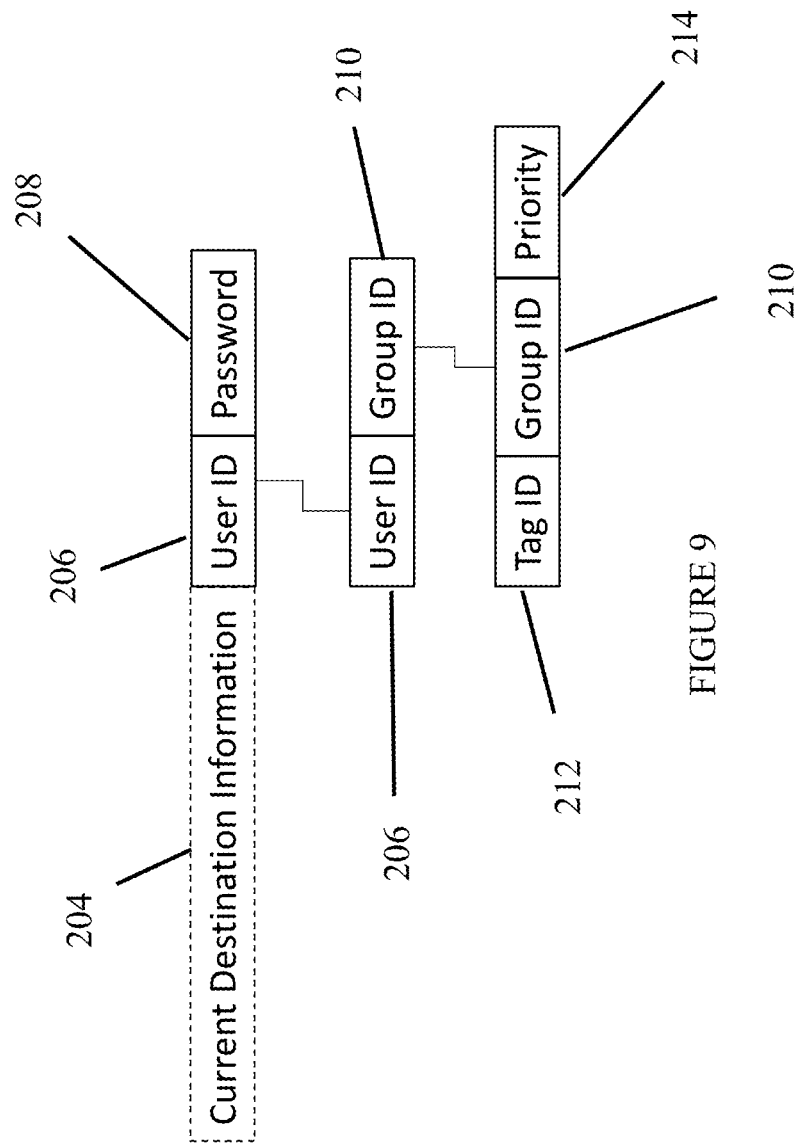
FIG. 9 is a schematic view of one embodiment of the present invention.

In another embodiment as shown in FIG. 9, each user identifier 206 may be associated with a group identifier 210. The tag ID 212 may then be associated with the group identifier 210 to enable the system to determine which group of users to transmit the audio/video data. In such an embodiment, the system detects a Tag ID 212 of a detected tag. The system then identifies the group identifier 210 associated with the tag ID 212. The system then identifies the users who are associated with the group identifier 210 matched to the Tag ID 212 of the detected tag. The system then transmits the audio/video data to the users associated with the group ID 210. The system transmits the audio/video data to the Current Destination Information 204 of the user ID 206 associated with the group ID 210.

FIGS. 8 and 9 also provide a priority rank 202, 214 associated with the Tag IDs 200, 212 of one embodiment. The priority rank enables the audio/video data of the zone in which the Tag ID of the highest priority is detected. For example, if a user is associated with multiple tag IDs, the user will receive the audio/video data of the zone in which the higher priority tag associated with the user is detected.

The streaming data, video and sound, is channeled to the local and the remote classroom 118 and remote students 120 through the Internet 122 as shown in FIG. 2. In another embodiment, the system may record the audio and video captured by the designated camera(s) of the active zone for later playback. Such recordings may be transmitted to the users of the group at a later time.

FIG. 2 shows a schematic of a system with four zones 110, 112, 114, 116, each zone contains one camera (with integrated microphone) 107 and one sensor, including but not limited to an identification device reader, a tag detector, antenna 105, etc. One reader 104 controls all four antennas and feeds tag information into one computer 108 that controls all zones. In one embodiment, one RFID tag, such as a master RFID tag, may supersede other tags. For example, a tag associated with the professor may supersede all other tags such that the zone in which the professor is located will be transmitted to all users. Referring to FIG. 2, the professor located in zone 112 is conducting an experiment. The following is an example of the sequence of events of one embodiment of the present invention:

1. The instructor enters Zone 112 to perform the experiment; the sensor, such as a tag detector, antenna 105 in zone 112 detects the instructor's tag ID 106.
2. The tag ID is transmitted to the reader 104.
3. The reader 104 processes and passes the information to the computer 108 through the Internet 122.
4. The computer 108 authenticates the ID, recognizes that the signal came from antenna 105 in Zone 112, and activates camera 107.
5. The camera 107 streams the experiment occurring at Zone 112. The stream includes video and audio.
6. The video and sound will be transmitted to local students and those students in remote classrooms 118 as well as individual remote students at home or work 120 in cyberspace.
7. When the instructor moves to a different zone to perform a new experiment, Steps 1-6 will be repeated for the new zone automatically.

The system can also facilitate collaborative experiments among members of virtual teams. In one embodiment, virtual teams have two types of members, local and remote. One or more local members are present in the physical classroom/laboratory. One or more remote members reside somewhere on the Internet. A member of the local team carries a tag with an ID, specific to that team. As the local team enters a zone, the tag ID of the team activates Steps 1-6 for the team. In other words, entering a zone with an RFID tag creates an exclusive sub network for communication among the members of that team. The system operates differently when teams are experimenting cooperatively as opposed to when a professor demonstrates an experiment. When the professor performs the experiments, his/her tag ID allows broadcasting the lab activities to all students. On the other hand, the tag ID of a team creates only a communication network amongst the members of that team. Multiple groups may perform lab experiments simultaneously. In this case, each team performs the experiment in a particular zone. Various teams may perform different experiments by rotation. The Tag ID may be programmed to accommodate communication networks of any size from connecting two people to connecting everyone and any combination in between.

The novelty of the present invention is that it facilitates cyber collaboration and learning for courses with laboratory and hands-on modules including but not limited to technology, science, engineering, business, vocational, the fine arts, medicine, and/or areas of interest, etc. In addition, the technology along with the concept of virtual or cyber teams brings an unprecedented level of interactivity among students in on-line courses with hands-on activities. The same unprecedented collaboration among members of cyber teams in other settings such as work environments, etc. can be achieved by the present invention.

Figure 3:
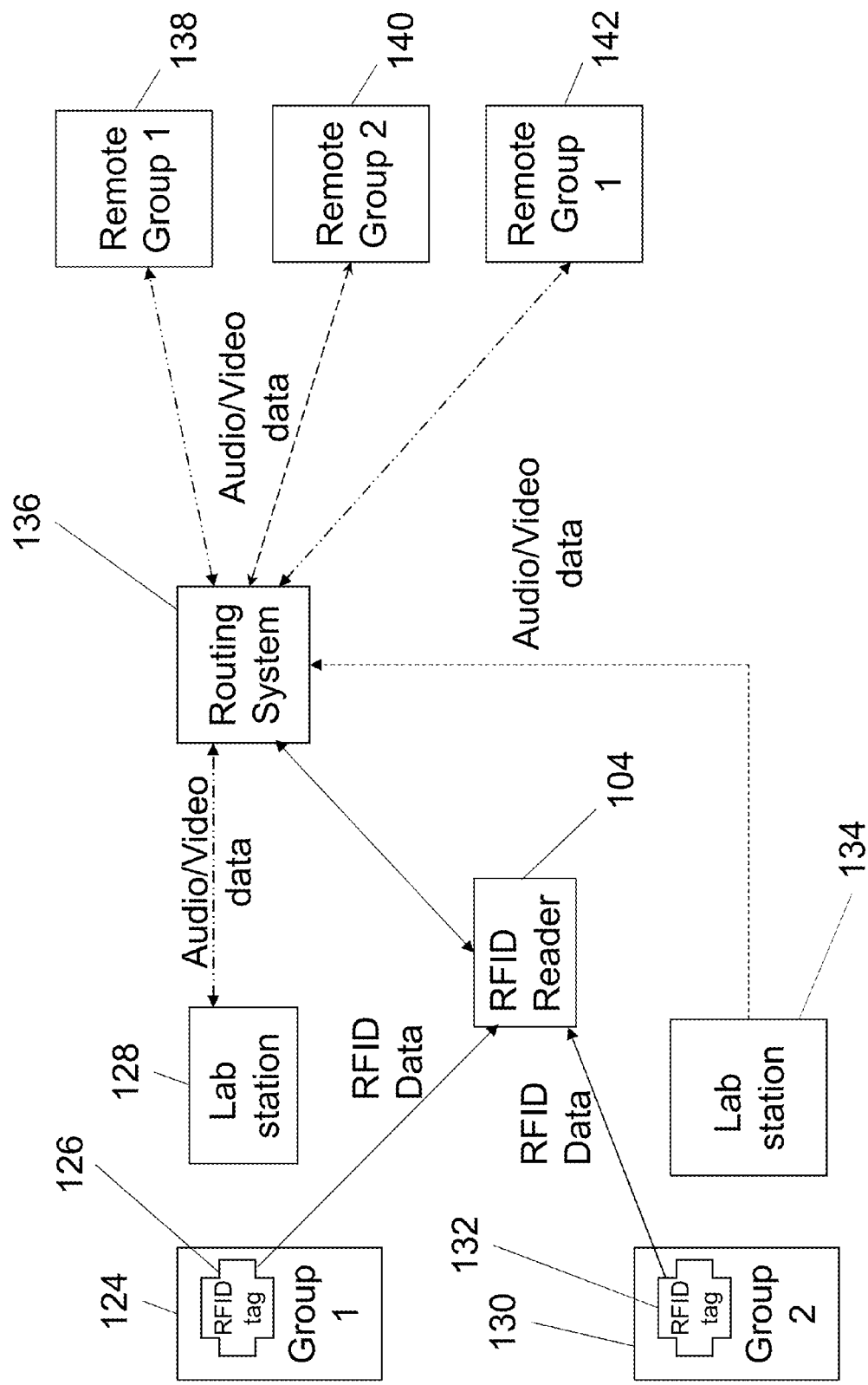
FIG. 3 is a flow diagram of one embodiment of the present invention.

FIG. 3 provides a flow diagram of one embodiment of the present invention. The local group's audio/video data is routed to the corresponding remote group members regardless of what station the local group is using. As the local group moves to different stations, the system detects the change, stops capturing audio/video data from the previous station, and begins sending audio/video from the current station.

Each group 124, 130 is associated with a corresponding RFID tag 126, 132. The tags 126, 132 serve as an identifier that identifies each user or group of users. Each group may include one or more users. Each group 124, 130 performs a task at a lab station 128, 134. As indicated above, a sensor, including but not limited to a tag detector, an RFID antenna, an identification device reader, etc. and camera are located at each zone, for example the lab stations 128, 134. Each group may travel between the different zones, lab stations 128, 134, to perform the designated task. As a group approaches the zone, the tag transmits the tag ID associated with the tag to the antennae. The antenna passes the data to RFID reader 104 for processing the tag ID. RFID reader 104 passes the ID to the Routing System 136. The Routing system 136 then activates the camera and transmits the audio and/or video to the users associated with the detected tag ID or group ID. As shown in FIG. 3, the audio/video data from lab station 128 at which group 124 is located is transmitted to other remote members 138, 142 of the group. Similarly, the audio/video data of the second group 130 is transmitted to its remote member 140.

The routing system 136 performs all the necessary processing and associates the appropriate users with the RFID tag ID. The system then transmits the audio/video data to the members of the same group associated with the detected RFID tag ID.

Figure 4:
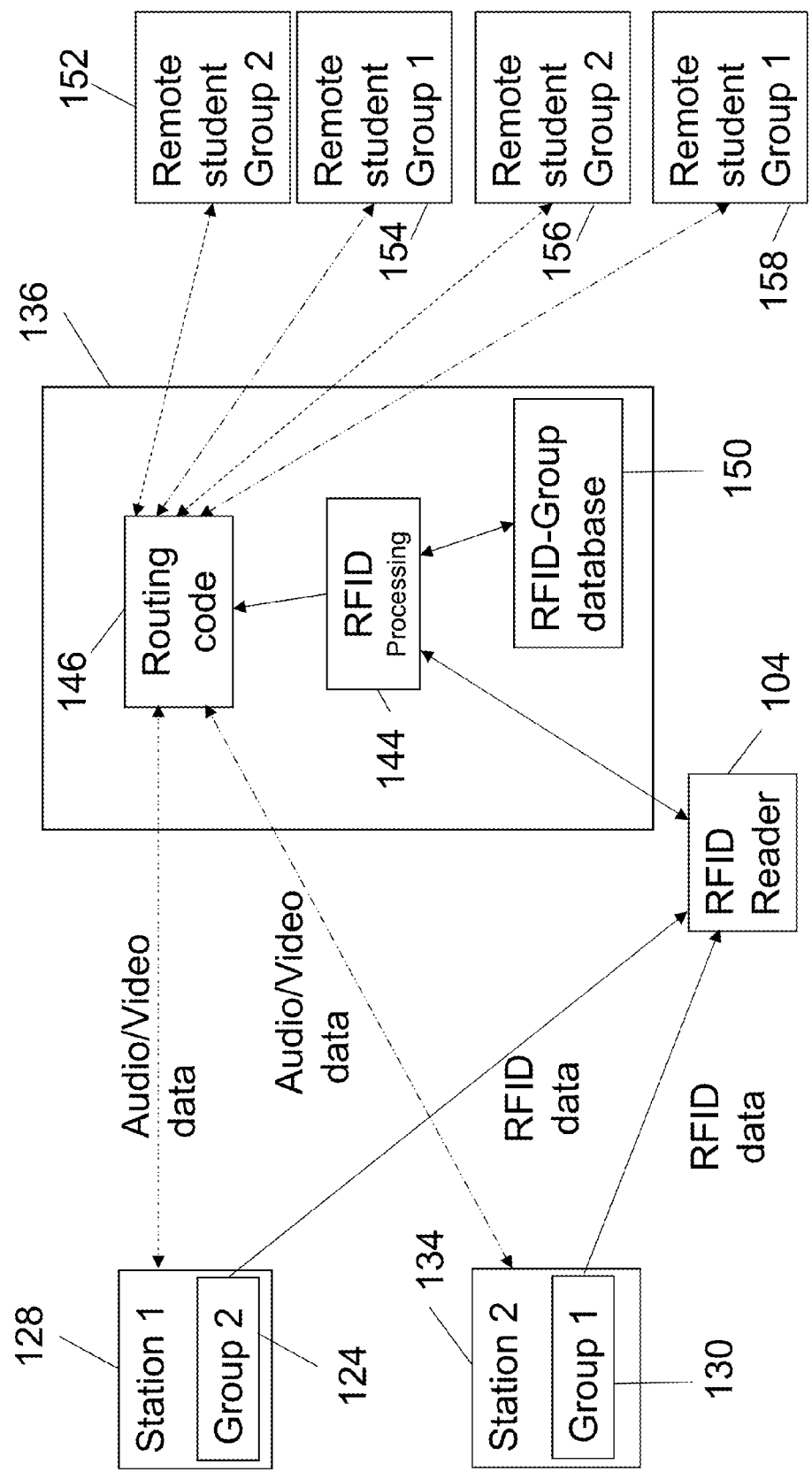
FIG. 4 is a flow diagram of one embodiment of the present invention.

FIG. 4 provides an illustration of the routing system 136 of one embodiment of the present invention. The RFID Processing subsystem 144 queries one or more RFID readers 104 for currently detected tags and the location of the antenna that detected the tag. The location of the sensor, such as a tag detector, that detected the tag corresponds to the location of an active zone or Station (e.g., 128). The returned tag data is then processed by RFID processing 144 and a query is sent to the RFID group database 150. RFID-Group database 150 contains the information regarding the members of each group that are associated with a particular tag ID.

The database 150 supplies information regarding the association of the members with the tag ID back to RFID processing 144. RFID processing 144 combines group association information with the information regarding the location of the current antenna, which is the same as the location of the active Station or zone. The combined information is passed to the Routing code 146 to create a communication sub network between the current station's audio/video sources and all members of the group or clients 152, 156.

The Routing code 146 activates the audio/video input associated with that RFID antenna, determines the locations to send the audio/video stream and transmits the video/audio stream to the correct remote students.

Any embodiment of the present invention is capable of performing a duplex video/audio communication between the laboratory and remote students/clients. Remote students can observe and listen and communicate with the local team members or the teacher. Conversely, remote students' video/audio data can also be delivered to a computer screen or a projector screen at the current location that the professor (or team member) is conducting the experiment. The present invention offers a dynamic environment for remote students to participate and collaborate with those present in the laboratory.

Figure 5:
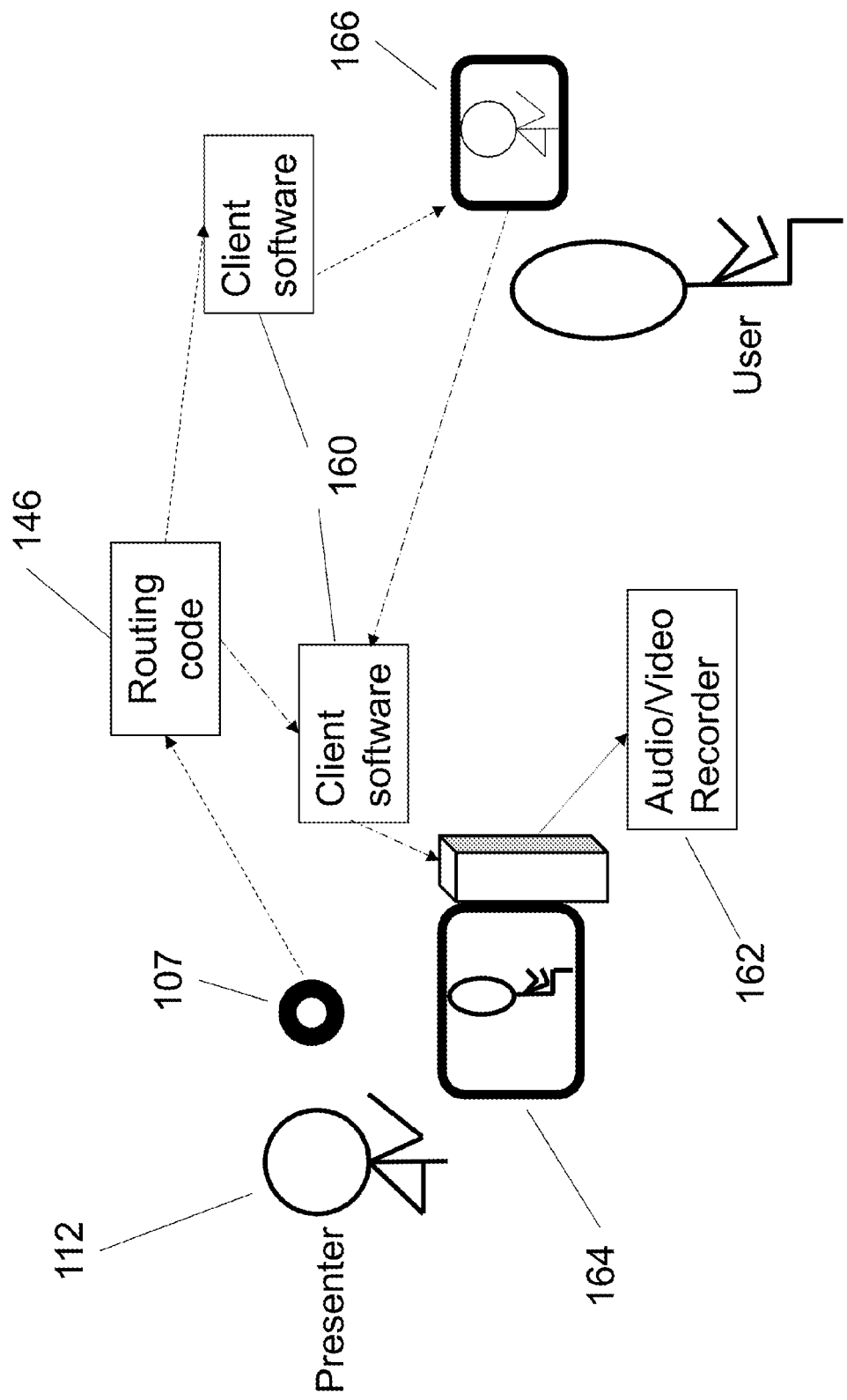
FIG. 5 is an environmental view of one embodiment of the present invention.

FIG. 5 provides an environmental view of one embodiment of the present invention depicting the essence of a duplex communication and recording capability. For simplicity, the exhibition of certain details, which were presented in earlier figures, are not shown to avoid duplication. Each zone or station 112 of such an embodiment implements an audio/video capture device 107, such as a camera with integrated microphone.

In one embodiment, every computer runs a client software 160 for the purpose of video/audio streaming. In another embodiment, the client software 160 may run a web browser to connect to the system. In one embodiment, client software 160 allows the remote users to transmit to their associated group or professor in the lab. Because the system knows the zone at which each group is located, the remote users may directly communicate with the group. The Routing Code 146 routes any communication from the remote users to the zone at the location of the local users of the same group or the professor.

FIG. 5 depicts an experiment being performed by a professor at zone 112. The audio/video device 107 captures the activities and reroutes through the Routing code 146 to remote user 166. Simultaneously, a live video and audio of the user 166 are captured by the user's webcam and are transmitted back to a display 164 at the existing location of the professor in Zone 112. As FIG. 5 shows, the duplex transmission of data may also be recorded by Audio/Video recorder 162 if so chosen. User 166 may also use other input devices such as a mouse and keyboard to communicate with the other group members.

Figure 6:
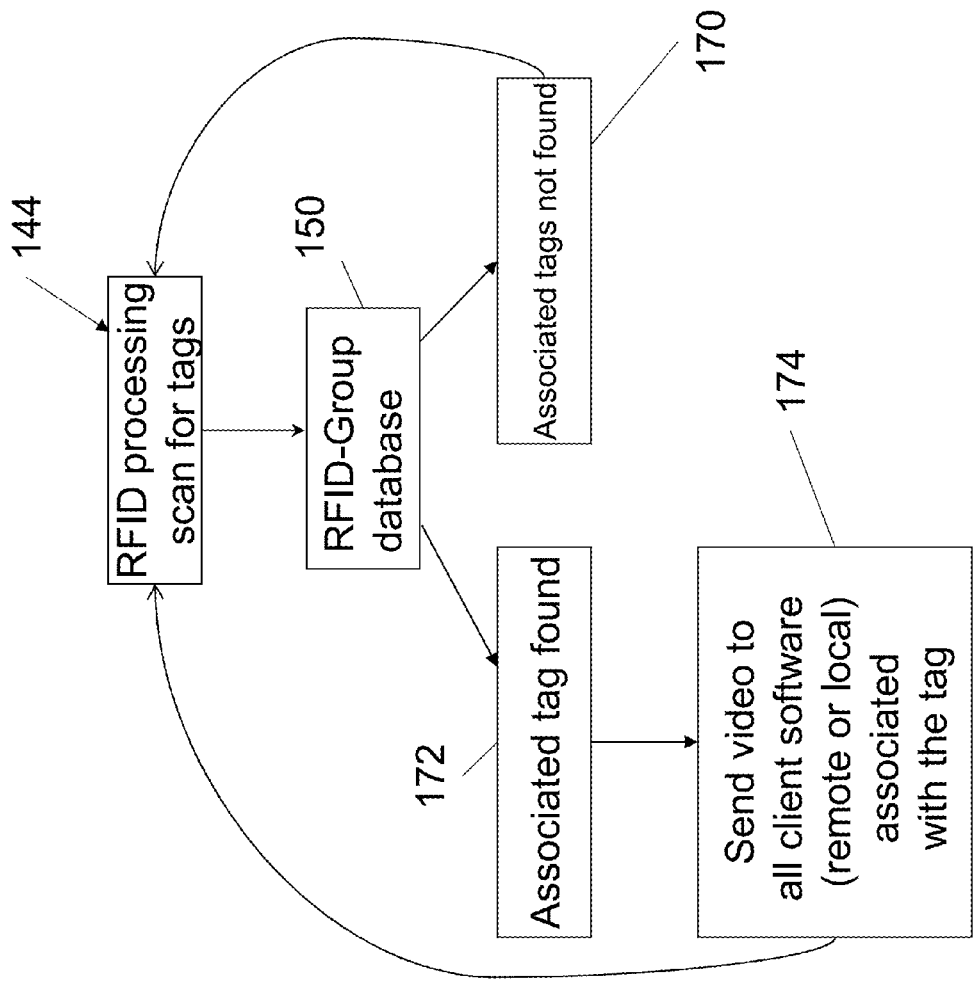
FIG. 6 is a flow diagram showing one embodiment of the present invention.

FIG. 6 provides a more detailed illustration of the system identifying the users associated with each group and transmitting the appropriate data to the corresponding user. The RFID processing 144 scans one or more sensors, such as tag detectors, identification device readers, RFID readers to detect tags. If a tag is found, the returned tag ID is then processed and a query is sent to RFID-Group database 150 to Check for association and group membership. If the detected tag ID matches (172) IDs in the database, the routing code determines where to send the audio/video stream. The system identifies the users who share the same tag ID or the group ID of the detected tag. The system transmits the audio/video stream to the users associated with the group at 174.

If no match is found (170) in the RFID-Group database, the RFID processing 144 continues to query the sensor, such as tag detectors, identification device readers, RFID reader, etc. until an associated tag is detected.

The system may dynamically change the video source based on the location of the local users. For example, a first group with a first RFID tag with a Tag ID is located at a first lab station. The RFID tag of the first group identifies that only members of the first group should receive the feed from the first group. Each of the users will be associated with the Tag ID. The routing software 136 routes the audio/video feed of the first group at the first station, the active zone, to other members of the first group, both remote members and remote classrooms, who are associated with the Tag ID. Remote group members of the second group do not receive the transmission as the members of the second group do not belong to the first group and are not associated with the Tag ID. As the first group with the first RFID tag moves to a second station, the routing software detects that the second station is an active zone and changes and reroutes all the video streams accordingly.

A feature of the present invention is a database containing the information for constructing a full network or constructing unlimited sub networks for linkages among users. In one embodiment of the database, each record contains a field containing tag IDs, which is used as primary key or primary ID. Each primary key refers to a user identifier and one or more users' destination information such as but not limited to IP address, port number, MAC address, URL, etc., from a group. One or more Master key or master ID in the database points to the destination of all users, students, participants, etc. Master IDs are usually reserved for the teacher or moderator. However, any user, student or participant can be equipped with a master ID (tag) if such participants need to communicate with everyone such as in presenting a group project to the entire class.

Figure 7:
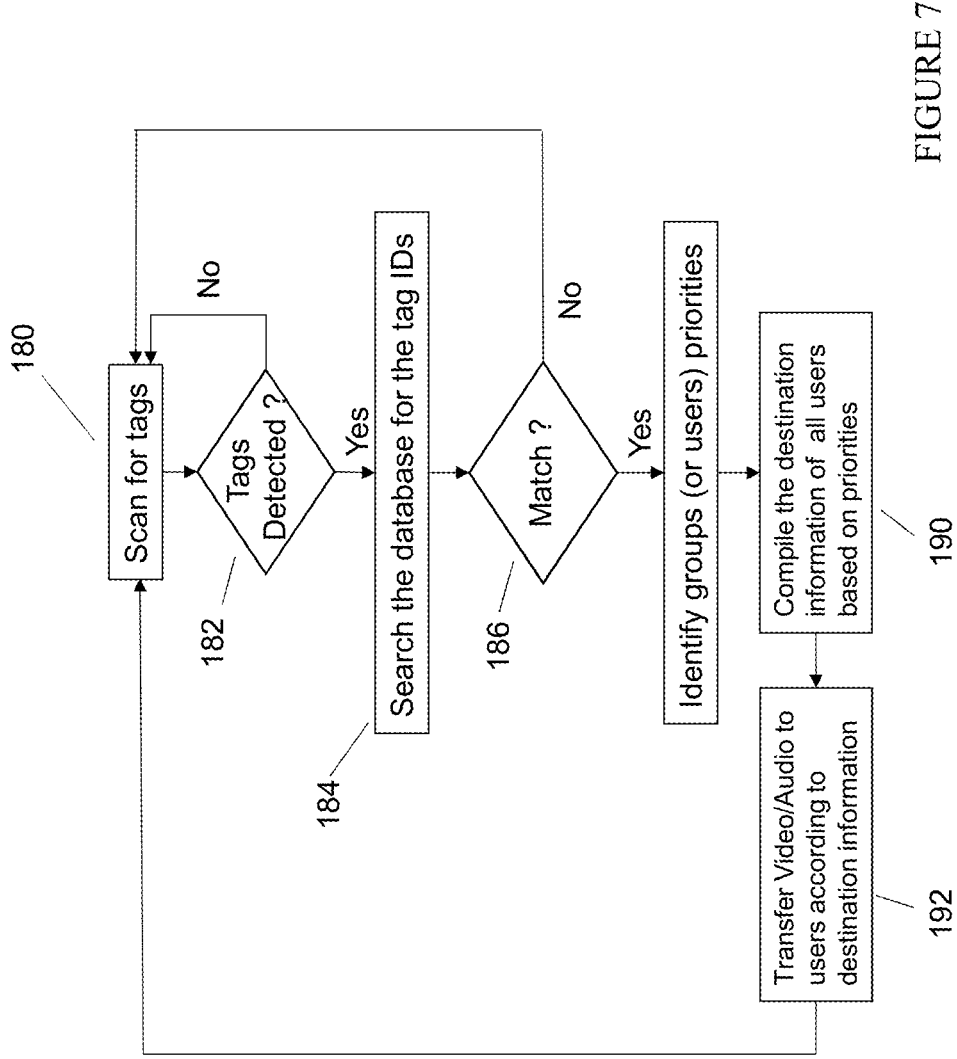
FIG. 7 is a flow diagram showing one embodiment of the present invention.

FIG. 7 shows a flow diagram of one embodiment of the present invention. The system continuously scans for RFID tags at step 180. If no tag is detected at step 182, scanning for tags step 180 will continue. If a tag is detected, the system uses the tag ID of the detected tag as a primary key to search the database at step 184. If no match is found at step 186 then scanning for tag step 180 will continue. If a match is found at step 186, the system will transmit the feed based upon the tag ID of the detected tag.

Priority step 188 identifies the priority ranking of the detected tags when multiple tags are detected. The system will transmit the audio/video data of the zones in which a tag is detected. However, if a user is associated with multiple detected tag IDs or detected group IDs, the system must determine which audio/video data to transmit to the user. The system checks the priority ranking of the tags associated with the user ID to determine which tag ID has the higher ranking. The system then transmits the higher ranking audio/video data of the zone in which the tag ID associated with the user that has the highest ranking.

If the tag ID is a master ID, the destination information of all users is compiled and then passed to step 192 for transferring audio/video to the destinations on the list. The destination information of those users associated with the tag ID is compiled at step 190 and then passed to step 192 for transferring audio/video to the destinations on the list. In another embodiment, the master ID can be associated with all of the users and the master ID is assigned the highest priority ranking.

The system stores the destination address of each user. The system may then transmit the appropriate feed to each user via the destination address associated with the user.

If the system detects more than one valid tag simultaneously in any single zone, the system defines a priority list identifying which tag id will take priority when transmitting the feeds to the users. The tag ID with the highest priority will determine the locations to which the feed is transmitted. For example, professors ID will have the highest priority and preempts other tags. The system compares the priority ranking of the tags detected zone to determine the priority as to which users will receive the audio/video data from the zone.

In one embodiment, multiple tags may be detected at multiple zones. In another embodiment, multiple tags may be detected at a single zone. The system identifies the group ID of the detected tag(s). The system then transmits the audio/video feed to all users that are associated with the group ID of the detected tags. In one embodiment, if more than one tag ID is presented to a zone, the union of all users associated with the Tag IDs will receive the video/audio feeds. In one embodiment, a tag may be associated with a Master ID. The master ID supersedes all other group IDs. The system transmits the audio/video information from the zone at which the Master ID is detected to all users.

If the Master ID is not detected, the system must determine which remote users shall receive the audio/video information. The system identifies the remote users who share the same tag ID/group ID as the detected identifier tag. The system then creates a communication link between the users with the detected tag ID located at the zone and the remote users with the detected tag ID. The system then allows data transmission between the users associated with the same Tag ID. The communication may be one way such that the remote users receive the audio/video information from the local group members. In another embodiment, the system may establish a two-way communication such that the remote users may interact with the local users.

In one embodiment, the system establishes rules as to which RFID tag will take priority when streaming the audio/video feed to the users. The system may identify a master ID that supersedes all other RFID tags. When the Master ID is detected by the system, the system will automatically stream the audio/video feed of the zone in which the Master tag is detected to the users associated with the Master ID. In one embodiment, the Master ID is associated with all of the users.

Once a zone detects an RFID tag, the system will continue to stream the audio/video feed to the users associated with the tag ID of the detected identifier tag as long as the zone continues to detect the RFID tag. The system will not revoke the streaming activities of the group until either the zone detects an RFID tag that supersedes, such as a Master tag, the currently active RFID tag or the zone stops detecting the currently active RFID tag. As indicated above, the system will revoke the currently active RFID tag and begin streaming to the users associated with the RFID that supersedes the currently active RFID tag.

In one embodiment, the system will associate each zone with one currently active RFID tag. If multiple RFID tags are detected at the same time in such an embodiment, the system will continue scanning for an RFID tag until only one RFID tag is detected. The system will then stream the audio/video feed to the group members associated with the currently active RFID tag until a superseding RFID tag is detected or the currently active RFID tag is no longer detected.

To confirm that a group is located at a zone, one embodiment of the present invention requires detection of the RFID tag for a period of time prior to streaming the audio/video feed to the users associated with the RFID tag, such as at least a half second or second.

The system may also require that the active RFID tag not be detected for a period of time before streaming is stopped from the zone. In such an embodiment, the system may require that the tag not be detected for at least a half second, such as two seconds.

The present invention has been described as providing live feeds to remote users. In another embodiment, the system may store the data captured by the cameras at the stations. The system may then store the data such that the data is associated with the group ID. Users with the same Group ID may then later review the stored data captured at the zones when the group was present. Such a system enables users to view recorded data for later playback.

The system may also provide a feed to a classroom. An RFID tag may be identified as a tag to establish a feed inside the classroom. Any time such a tag is detected, the system will stream the feed from the zone in which the tag is detected to the classroom.

Figure 10:
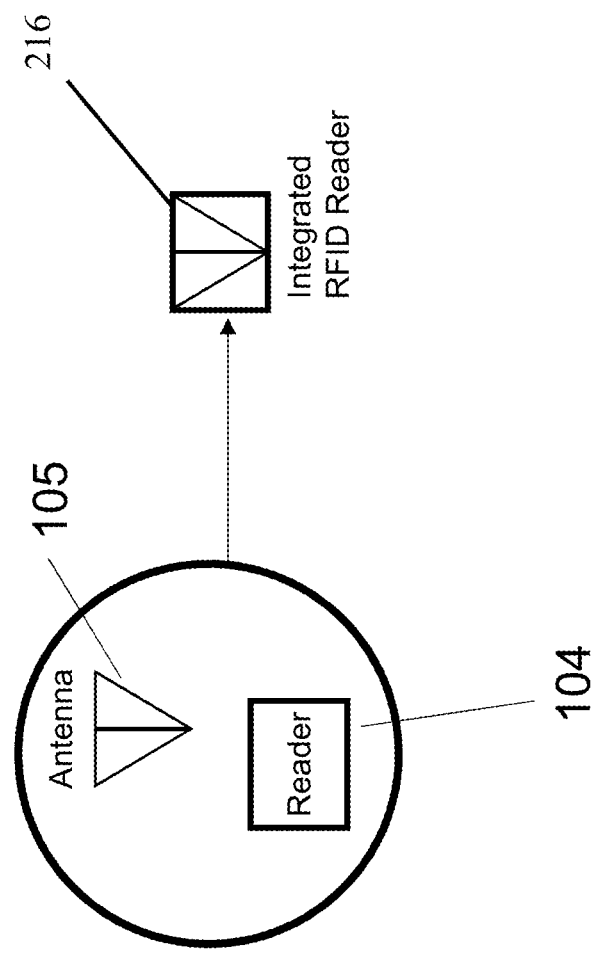
FIG. 10 is a schematic view of one component of the present invention.

While the preceding illustrations show readers, antennas and cameras as separate devices for clarity of presentation, it is also possible to implement integrated devices. In one embodiment, the reader 104 and antenna 105 may be integrated as one unit 216 as shown in FIG. 10. Such integrated devices are currently in the market and available for implementation. In another embodiment shown in FIG. 11, the three devices, camera (with microphone) 107, Reader 104 and antenna 105 may be integrated as one unit 218. Such integrated devices may become available in the near future as stand-alone devices or as handheld computers, tablets, smart phones, etc. equipped with RFID readers and antennas in addition to the cameras and microphone with which they are currently equipped. The nature of the invention and claims will remain intact regardless of hardware implementation.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for transmitting audio/video data captured by an audio/video capture device over a network to a remote user by a computing device, the system comprising:
   an identifier device that identifies at least one user;
   a device ID associated with the identifier device, the remote user associated with the device ID;
   a first sensor detecting the identifier device (the detected identifier device) and the device ID associated with the detected identifier device, the sensor activating the audio/video capture device to capture the audio/video data after the first sensor detects the detected identifier device; and
   the computing device transmitting the audio/video data to the remote user associated with the device ID of the detected identifier device.

2. The system of claim 1 wherein the sensor is associated with a first zone.

3. The system of claim 2 wherein the audio/video capture device is directed toward the first zone to capture the audio or video occurring at the first zone.

4. The system of claim 1 wherein the identifier device is an RFID tag.

5. The system of claim 4 wherein the first sensor is an antenna in communication with a reader.

6. The system of claim 4 wherein the first sensor is a reader.

7. The system of claim 4 further comprising:
   a second sensor associated with a second zone, the second sensor detecting the identifier device (the detected identifier device) and the device ID associated with the detected identifier device, the second sensor activating the audio/video capture device to capture audio or video occurring after the second sensor detects the detected identifier device, the audio/video capture device capturing the audio or video occurring at the second zone,
   the computing device transmitting the audio/video data of the second zone to the remote user associated with the device ID of the detected identifier device.

8. The system of claim 1 further comprising:
   a user identifier associated with the remote user, the user identifier associated with the device ID,
   the computing device identifying the user identifier associated with the remote user; and
   the computing device transmitting the audio/video data to the remote user if the device ID of the detected identifier device is associated with the user identifier of the remote user.

9. The system of claim 8 wherein the computing device does not transmit the audio/video data to the remote user if the user identifier of the remote user is not associated with the device ID of the detected identifier device.

10. A system for transmitting audio/video data over a network to a remote user by a computing device, the system comprising:
    an identifier tag that identifies at least one user;
    a tag ID associated with the identifier tag, the remote user associated with the tag ID;
    a first zone identifying an area for which audio/video data is to be captured;
    a first tag detector detecting the identifier tag (the detected identifier tag) and the tag ID associated with the detected identifier tag, the first tag detector associated with the first zone;
    a first audio/video capture device capable of capturing audio or video occurring at the first zone wherein detection of the tag detector by the first tag detector activates the first audio/video capture device to capture the audio/video data occurring at the first zone;
    a second zone identifying an area for which audio/video data is to be captured;
    a second tag detector detecting the identifier tag (the detected identifier tag) and the tag ID associated with the detected identifier tag, the second tag detector associated with the second zone;
    a second audio/video capture device capable of capturing audio or video occurring at the second zone wherein detection of the tag detector by the second tag identifier activates the second audio/video capture device to capture the audio/video data occurring at the second zone; and the computing device transmitting the audio/video data of the zone in which the identifier tag is detected to the remote user associated with the tag ID of the detected identifier tag.

11. The system of claim 10 wherein the identifier tag is an RFID tag.

12. The system of claim 11 wherein the first tag detector is an antenna in communication with a reader.

13. The system of claim 11 wherein the first tag detector is a reader.

14. The system of claim 10 further comprising:
a user identifier associated with the remote user, the user identifier associated with the tag ID,
the computing device identifying the user identifier associated with the remote user; and
the computing device transmitting the audio/video data of the zone in which the identifier tag is detected to the remote user associated with the tag ID of the detected identifier tag if the detected tag ID is associated with the user identifier of the remote user.

15. The system of claim 14 wherein the computing device does not transmit the audio/video data to the remote user if the user identifier of the remote user is not associated with the tag ID of the detected identifier tag.

16. The system of claim 10 wherein more than one remote user is associated with the tag ID.

17. The system of claim 10 further comprising:
a master identifier tag wherein detection of the master identifier by one of the tag detectors transmits the audio/video data of the zone in with the master identifier tag is detected to all remote users.

18. A system for transmitting audio/video data over a network to a first remote user and a second remote user by a computing device, the system comprising:
a first identifier tag that identifies at least one user;
a second identifier tag that identifies at least one user;
a first tag ID associated with the first identifier tag, the first remote user associated with the first tag ID;
a second tag ID associated with the second identifier tag, the second remote user associated with the second tag ID;
a first zone identifying an area for which audio/video data is to be captured;
a first tag detector detecting the identifier tag (the detected identifier tag) and the tag ID associated with the detected identifier tag, the first tag detector associated with the first zone;
a first audio/video capture device capable of capturing audio or video occurring at the first zone wherein detection of the tag detector by the first tag detector activates the first audio/video capture device to capture the audio/video data occurring at the first zone;
a second zone identifying an area for which audio/video data is to be captured;
a second tag detector detecting the identifier tag (the detected identifier tag) and the tag ID associated with the detected identifier tag, the second tag detector associated with the second zone;
a second audio/video capture device capable of capturing audio or video occurring at the second zone wherein detection of the tag detector by the second tag identifier activates the second audio/video capture device to capture the audio/video data occurring at the second zone; and
the computing device transmitting the audio/video data of the zone in which the detected identifier tag is detected to the remote user associated with the tag ID of the detected identifier tag.

19. The system of claim 18 further comprising:
a priority ranking assigned to the first identifier tag and the second identifier tag wherein the first identifier tag is assigned priority over the second identifier tag;
wherein the first tag detector detects the first tag ID and the second tag detector detects the second tag ID;
the computing device transmitting the audio/video data of the first zone to the first remote user and the second remote user.

20. The system of claim 18 wherein the first tag detector detects the first tag ID and the second tag ID;
the computing device transmitting the audio/video data of the first zone to the first remote user and the second remote user.

* * * * *